United States Patent
Hall et al.

(10) Patent No.: US 10,891,866 B2
(45) Date of Patent: *Jan. 12, 2021

(54) PARKING ASSIST APPARATUS

(71) Applicant: Hall Labs LLC, Provo, UT (US)

(72) Inventors: David R. Hall, Provo, UT (US);
Jerome Miles, Spanish Fork, UT (US);
Casey Webb, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/189,878

(22) Filed: Nov. 13, 2018

(65) Prior Publication Data

US 2020/0152066 A1 May 14, 2020

(51) Int. Cl.
| | |
|---|---|
| B60Q 1/48 | (2006.01) |
| G08G 1/16 | (2006.01) |
| E05F 15/73 | (2015.01) |
| E04H 6/42 | (2006.01) |

(52) U.S. Cl.
CPC .............. G08G 1/168 (2013.01); E04H 6/426 (2013.01); E05F 15/73 (2015.01); E05Y 2900/106 (2013.01)

(58) Field of Classification Search
CPC   G08G 1/68; E05F 15/73; E04H 6/426; E05Y 2900/106
USPC ...................................................... 340/932.2
See application file for complete search history.

(56) References Cited

U.S. PATENT DOCUMENTS

| | | | | |
|---|---|---|---|---|
| 6,218,962 | B1* | 4/2001 | Fiene ....................... | B60Q 1/48 340/425.5 |
| 6,707,486 | B1* | 3/2004 | Millet ...................... | H04N 7/18 250/340 |
| 7,640,107 | B2* | 12/2009 | Shimizu ................. | B60K 35/00 701/523 |
| 8,953,043 | B2* | 2/2015 | Kadowaki ................ | H04N 7/18 348/148 |
| 2005/0156758 | A1* | 7/2005 | Gilliss .................... | G08G 1/164 340/932.2 |
| 2007/0146165 | A1* | 6/2007 | Tanaka ............... | B62D 15/0285 340/932.2 |
| 2010/0238051 | A1* | 9/2010 | Suzuki ...................... | B60R 1/00 340/932.2 |
| 2010/0274474 | A1* | 10/2010 | Takano .............. | B62D 15/0275 701/532 |
| 2011/0273310 | A1* | 11/2011 | Kadowaki .......... | B62D 15/0285 340/932.2 |
| 2012/0139206 | A1* | 6/2012 | May ......................... | B60R 3/02 280/166 |

(Continued)

Primary Examiner — Kerri L McNally
Assistant Examiner — Thang D Tran (57) ABSTRACT

A parking assist apparatus is disclosed. A parking assist apparatus includes an overhead sensor mounted to a garage ceiling and a controller adapted to receive instructions from a remote device to set an optimum parking position. The controller is adapted to display one or more guidelines on a display screen in the vehicle to indicate the position of the vehicle in relation to the optimum parking position and to switch the system between a sleep mode and an awake mode. The invention also includes a motion sensor attached to a garage door. When the motion sensor senses the garage door being opened, the motion sensor sends a signal to the controller, whereupon the controller switches the system to the awake mode.

23 Claims, 3 Drawing Sheets

(56) References Cited

U.S. PATENT DOCUMENTS

| | | | |
|---|---|---|---|
| 2013/0085637 A1* | 4/2013 | Grimm | B60W 30/06 701/25 |
| 2013/0120161 A1* | 5/2013 | Wakabayashi | B62D 15/028 340/932.2 |
| 2013/0162829 A1* | 6/2013 | Kadowaki | B60R 1/00 348/148 |
| 2014/0222252 A1* | 8/2014 | Matters | B62D 15/027 701/2 |
| 2014/0292208 A1* | 10/2014 | Chemel | H05B 33/0854 315/154 |
| 2014/0305599 A1* | 10/2014 | Pimenov | E06B 9/68 160/7 |
| 2014/0354452 A1* | 12/2014 | Okuyama | B62D 15/028 340/932.2 |
| 2015/0091741 A1* | 4/2015 | Stefik | G08G 1/14 340/932.2 |
| 2015/0294572 A1* | 10/2015 | Anstett | G08G 1/04 340/932.2 |
| 2015/0369618 A1* | 12/2015 | Barnard | G01S 19/13 701/491 |
| 2016/0009177 A1* | 1/2016 | Brooks | B65G 69/006 340/468 |
| 2016/0152255 A1* | 6/2016 | Cuthbertson | B60B 27/0068 701/19 |
| 2016/0203721 A1* | 7/2016 | Wright | G08G 1/163 348/118 |
| 2016/0288833 A1* | 10/2016 | Heimberger | B62D 15/027 |
| 2016/0311429 A1* | 10/2016 | Holland-Letz | B62D 15/0285 |
| 2016/0368489 A1* | 12/2016 | Aich | B60W 30/06 |
| 2017/0034485 A1* | 2/2017 | Scalisi | H04N 7/186 |
| 2017/0197550 A1* | 7/2017 | Navarro Zavala | B60Q 1/48 |
| 2017/0246961 A1* | 8/2017 | Lee | B60L 53/30 |
| 2017/0251183 A1* | 8/2017 | Crooks | G07G 1/0054 |
| 2017/0294113 A1* | 10/2017 | McNabb | G08C 17/02 |
| 2017/0318797 A1* | 11/2017 | Smith | A01M 29/16 |
| 2017/0323227 A1* | 11/2017 | Sadeghi | G06Q 20/102 |
| 2017/0345304 A1* | 11/2017 | Oesterling | G08G 1/149 |
| 2018/0216389 A1* | 8/2018 | Tsui | E05F 15/40 |
| 2018/0240343 A1* | 8/2018 | Nordbruch | B60W 30/09 |
| 2018/0245395 A1* | 8/2018 | Huggins | E05F 15/77 |
| 2018/0281858 A1* | 10/2018 | Griffith | B62D 15/028 |
| 2019/0004487 A1* | 1/2019 | Yuzawa | G05B 15/02 |
| 2019/0063141 A1* | 2/2019 | Rosenmarkle | E05F 15/668 |

* cited by examiner

PARKING ASSIST APPARATUS

CROSS-REFERENCE TO RELATED APPLICATIONS

This application is a continuation of U.S. provisional application No. 62/526,652 filed 29 Jun. 2017 and U.S. application Ser. No. 15/956,251 filed 18 Apr. 2018. The entire disclosures of which are incorporated herein by reference.

TECHNICAL FIELD

This invention relates generally to parking assist apparatuses.

BACKGROUND

When parking a vehicle in a garage or other confined space, it may be difficult to park without hitting or running into the surroundings, such as a wall or object which is in the confined space or garage. This is due to limited vision and the difficulty of maneuvering a vehicle. Parking assist apparatuses exist which act as a guide and aid to an individual parking a vehicle. Some of these apparatuses include a stop sign, a string with a ball attached, or a laser light which is mounted to a ceiling. The stop signs are placed on the ground and may take up limited and valuable garage floor space. When individuals use a string with a ball on the end, they need to readjust the height of the ball various times by shortening or lengthening the string so that it hits the appropriate spot on their vehicle when they are parked in the optimal position. This may be accomplished by guessing and checking, which is often ineffective. The lasers require the user to manually adjust a laser beam's position by shifting the laser itself, which laser indicates where a driver should stop their vehicle. This is inconvenient because a user must either guess where the laser should be positioned as a guide for their vehicle, and then move their vehicle and determine if the laser is in the appropriate position, or park their vehicle, and then attempt to climb above their vehicle and position the laser. The latter option may be dangerous, inefficient, and difficult.

In addition, if more than one vehicle is parked in the same garage or confined space, the vehicles may be different sizes and may require the laser to point to a different place depending on which vehicle is being parked. Because existing laser park assist apparatuses are often motion activated, they have no way of identifying which or what type of vehicle is being parked. Some laser park assist apparatuses include two lasers for a two-car garage, but this requires that a user consistently park each vehicle in the same spot, and that they adjust both laser lights manually to appropriately guide the corresponding vehicles.

Also, none of these apparatuses are capable of indicating to a driver that there is an object in the way. For example, sometimes it is difficult to see an object which is close to the front of the hood of the car if the object is on the ground or not very tall. This can be especially true in a garage, which is often dark or dimly lit. In these cases, a driver may inadvertently run over a toy or bike as they are attempting to park.

SUMMARY

In a first aspect, the disclosure provides a parking assist apparatus including an overhead sensor mounted to a garage ceiling and a controller adapted to receive instructions from a remote device to set an optimum parking position. The controller is adapted to display one or more guidelines on a display screen in the vehicle to indicate the position of the vehicle in relation to the optimum parking position and to switch the system between a sleep mode and an awake mode. The invention also includes a motion sensor attached to a garage door. When the motion sensor senses the garage door being opened, the motion sensor sends a signal to the controller, whereupon the controller switches the system to the awake mode.

In a second aspect, the disclosure provides a controller which puts the system in sleep mode within a predetermined time of receiving a signal that the garage door has been closed.

In another embodiment, the motion sensor is attached to the inside of the garage door, and the system includes a short-range wireless beacon, adapted to send signals to the overhead sensor. The short-range wireless beacon is coupled to a vehicle. The overhead sensor, preferably, is a camera.

In a third aspect, the disclosure provides a parking assist apparatus including an overhead sensor and a controller adapted to receive instructions from a remote device to set an optimum parking position, wherein the controller is adapted to project a concentrated light onto the optimum parking position. This light indicates the position of the vehicle in relation to the optimum parking position. The system also includes a motion sensor attached to a garage door. The motion sensor senses when a garage door is being opened, and is adapted to send signals to the overhead sensor to turn on when motion from the garage door is detected.

Wherein the invention includes a concentrated light, it changes colors, shape, or both to indicate that a vehicle should stop. Further, the visual information, preferably captured by a camera, may be transmitted to a display screen in a vehicle. Typically, the invention is adapted to make adjustments to the guidelines based on inputs from the short-range wireless beacons. The system preferably includes mounting hardware for mounting the parking assist apparatus to a ceiling or wall.

BRIEF DESCRIPTION OF THE DRAWINGS

The following drawings are provided to illustrate certain embodiments described herein. The drawings are merely illustrative, and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "awake mode" is meant to refer to an apparatus using a power source and thus being able to function or operate.

As used herein, "sleep mode" is mean to refer to parts of an apparatus not using a power source.

As used herein, "garage" is meant to refer to a building or shed intended for housing a vehicle.

Wherein an individual finds it difficult to park in a small or confined space without assistance or a guide, a parking assist apparatus is useful. However, a parking assist apparatus does not need to be on at all times. That is to say, a parking assist apparatus requires a power source. A power source is batteries in one embodiment, or an electric power source in another. Leaving a parking assist apparatus on at all times wastes energy, and will ultimately cost a user more money. Therefore, it is advantageous that a parking assist apparatus is fully turned on, or in awake mode, only when it is being used. A parking assist apparatus may be put into a sleep mode, wherein parts of the device are turned off to save energy. In prior art, some motion sensors are located inside a garage, and are configured such that they detect the motion of the moving vehicle and the parking assist apparatus is activated or turned on by the detection of the vehicle moving. However, this system often fails, as a vehicle is sometimes moving too slowly into a garage or other confined space for a motion sensor to detect motion. Alternatively, a motion sensor attached to a garage door senses the motion of the opening of the garage door as a user's vehicle approaches the area in which they will park their vehicle. As the motion is sensed, the motion sensor sends a signal to the controller which switched the overhead sensor to awake mode.

Preferably, the parking assist apparatus switches back to sleep mode after a predetermined time. In one embodiment, the predetermined time is adjustable by the user via a smart phone running an app. In another embodiment, the predetermined time is set by the manufacturers. In one example, the parking assist apparatus switches to sleep mode one minute after it has been switched to awake mode. In a less preferred embodiment, the parking assist apparatus switches to sleep mode five minutes after it has been switched to awake mode. In a more preferred embodiment, the parking assist apparatus switches to sleep mode once a user has put their vehicle in park. In another embedment, a user can manually put the parking assist apparatus in sleep mode. This is accomplished via a smart phone running an app. Wherein the garage motion sensor fails, for example, if it runs out of power, a user manually turns on the parking assist apparatus via a smart phone running an app.

The garage door motion sensor may be a vibration sensor or passive infrared sensor. In another example, the garage motion sensor is both a vibration sensor and a passive infrared sensor. In one embodiment, a driver uses a garage door opener to open their garage door. The garage door, in one example, is opened by a remote garage door opener. In another embodiment, a remote garage door opener also indicates to the controller to switch the parking assist apparatus to awake mode.

Preferably, the parking assist apparatus is equipped with short-range wireless connection, such as Bluetooth, thus allowing it to be controlled wirelessly by a device such as a smart phone. As such, after installing the parking assist apparatus, users can make adjustments to the position of the overhead sensor or a concentrated light from the ground level with their smart phone or other short-range wireless connection device. As such, they are able to alter the position of the concentrated light, which may be a laser, without needing to move the light manually. Users do not need to climb back up to the concentrated light, and they can park their vehicle and make necessary adjustments without having to try and get to the concentrated light above their vehicle while it is parked. Additionally, the parking assist apparatus is able to transmit a live feed of the bird's-eye-view. The live feed can be received on a driver's smart phone, or wherein a vehicle is equipped, on a screen in a vehicle (such as back-up screen). This allows a driver to see exactly where their vehicle is in the garage or confined space, and how close they are to any walls or other objects that may otherwise be unseen, such as a toy that is in front of the vehicle. Also, it is often the case that different vehicles need to be parked in the same garage space at different times. For example, an individual might own a truck and a sedan, and want to alternate parking them in the same spot in a garage. The parking assist apparatus is able to read which vehicle is being parked because the short-range wireless beacon is in communication with the overhead sensor and sends a signal to the overhead sensor, indicating which vehicle is approaching. The overhead sensor accordingly adjusts its position to suit the vehicle being parked.

The parking assist apparatus is comprised of a short-range wireless beacon which may be coupled to a vehicle. The short-range wireless beacon can be integrated into a cigarette lighter charging port and/or contain batteries and emits a signal to the overhead sensor such that the overhead sensor receives information indicating which vehicle is approaching. This is accomplished because the overhead sensor and the short-range wireless beacon connect to the same network, allowing them to share data. The shared network could be a private network, localized network, (wherein devices at a single location are able to share information, such as a home network) or a public network. Each beacon has a unique advertisement—that is, a radio frequency—coded thereon which is a unique identifier. The short-range wireless beacon constantly emits the advertisement, and when it approaches the overhead sensor, the overhead sensor is able to read the advertisement. Once the overhead sensor receives the advertisement, it is adapted to make adjustments to the guidelines which are viewable on a display screen—which may be a tablet, smart phone screen, or screen in a vehicle such as a backup screen or controls screen. Preferably, the parking assist apparatus provides a node for a WiFi network.

A concentrated light serves as an additional guide to a user as they are parking a vehicle. The concentrated light may be a laser, or in one example a red laser. In the current art, owners of laser parking assist apparatuses must know the exact spot on their dashboard where the guiding laser must be when they have reached the optimal parking position. This can be difficult to monitor or remember when parking a vehicle, as there are often distractions when parking a vehicle—such as when other people are in the car, when the driver is talking on the phone, or when music is playing. The parking assist apparatus eliminates the need for a user to memorize where the concentrated light must be on their vehicle in order to indicate that they should stop. This is accomplished by changing the color of the laser as soon as the vehicle has arrived at the position where it should stop. For example, the laser is red as a user is pulling in, and immediately turns to green once the user should stop and park the vehicle. In another embodiment, the laser is in the shape of a circle as the user is pulling in, and switches to the shape of an octagon when a user should stop and park the vehicle. Furthermore, the concentrated light may change color and shape simultaneously to indicate that a user should stop their vehicle. For example, the concentrated light shifts from a green circle to a red octagon when a user should stop their vehicle.

Preferably, the overhead sensor is a camera, and as such may provide a live bird's-eye-view image of a vehicle as it is parking. As a user is parking a vehicle, they can view their surroundings and where their vehicle is in the surroundings. Additionally, they are able to view any objects, animals, or people that might not be visible from a driver's perspective—such as a bike, shoes, skateboards, helmets, tools, a cat, a dog, or a child. In one embodiment, the parking assist apparatus is comprised of speakers. An alarm indicates to a user that they are approaching an object by making a beeping noise or by playing a warning such as "the vehicle is about to hit an object". Then, even if a user is not monitoring a display screen with a bird's-eye-view feed as they are parking, they receive an audible warning of an impending collision. Wherein the parking assist apparatus is not equipped with speakers, the alarm may also sound through a vehicle's speakers, or through the app on a smart phone.

In one embodiment, the overhead sensor is an active-pixel sensor, such as a complementary metal-oxide-semiconductor (CMOS) sensor. A CMOS sensor is useful because it allows for capturing high quality video and images and requires less power and is smaller than a charge-coupled device (CCD) image sensor. A CMOS sensor processes the electrical charges received from light with an amplifier for each pixel, whereas a CCD sensor typically has only a single amplifier for all its pixels. This allows for a CMOS sensor to capture and process images very quickly, providing more information for a user as they use the parking assist apparatus for parking or for security surveillance. CMOS sensors can also zoom, which may be useful if a user uses the parking assist apparatus to monitor conditions in their garage when they are not there. The CMOS sensor may be a megapixel CMOS sensor, which further increases the amount of detail that the sensor can capture. This may be especially useful when trying to identify a person that the sensor has recorded or is recording. For example, if the overhead sensor is used to surveil, and a burglary has occurred, the possibility of identifying the thief is improved if the CMOS sensor is a megapixel CMOS sensor.

In another embodiment, the overhead sensor is a CCD image sensor, which, like a CMOS image sensor, is a light detection sensor that converts electrical data into a digital value. Both CMOS and CCD sensors have the ability to capture images in the near infrared, but CCD sensors capture more detail in the near infrared, making CCD image sensors a better sensor during the nighttime or in low light. CCD sensors are also less susceptible to noise and may capture crisper and clearer images. Wherein the parking assist apparatus is placed in an area with very low light, such as a small garage without windows or lighting, a CCD image sensor may be preferred to a CMOS image sensor. Because CCD sensors require more power, they are more prone to overheating than a CMOS sensor. Wherein the overhead sensor is a CCD sensor, it may be a megapixel CCD sensor.

In yet another embodiment, the sensor may work by other means, such as thermal, sonar or radar imaging. The important trait for the sensor is that it can detect the perimeter of the vehicle in real time.

The overhead sensor may also be a camera configured for detecting motion, whereby the camera does not begin recording or sending any images until motion is detected.

The parking assist apparatus is equipped to draw guidelines for a vehicle based on which vehicle is parking, and to display these guidelines on a display screen. The guidelines may be composed of four angles, one for each corner of the vehicle, or of a single line that spans the width of the car, or of two lines near the front tires of the car. It may also be a closed box or an open box. As a user pulls their car into a garage or other confined space, the overhead sensor receives the advertisement from the short-range wireless beacon, and the parking assist apparatus indicates where the lines should be displayed on a display screen. Then a user can see, via their display screen, their vehicle from an overhead view, and lines wherein the vehicle should be fitted for a preferred parking position. Correctional guidelines may also be displayed on a display screen. For example, it is sometimes difficult to park a vehicle at the best angle. This may be true when driving a large vehicle, when driving at night, or when driving a new vehicle that a user is not yet familiar with. When pulling into a garage at a wrong angle, a user is at risk of hitting a wall or other object. The parking assist apparatus, however, also displays correctional guidelines, displayed on a display screen, indicating to a user to what degree and in which direction they should turn their vehicle wheels in order to straighten out or to pull into the preferred parking spot for the vehicle that they are driving. For example, if a user is driving a new truck and they enter the garage at a slight angle when they should enter straight, the parking assist apparatus displays, on a display screen, guidelines which may veer left, indicating that a user should turn their wheels to the left in order to properly align their vehicle with the preferred parking position The overhead sensor may be a motion sensor or a camera. In some embodiments, the display screen built into a vehicle may not be adapted to connect to the parking assist apparatus. A module may be adapted to connect to a speaker, such that the live feed captured by the overhead sensor is displayed onto a display screen in a vehicle. In one embodiment, the short-range wireless beacon and the module are combined into one module.

Wherein the parking assist apparatus is equipped to use LIDAR, the parking assist apparatus measures distances with the concentrated light which is preferably a laser and may use LIDAR to determine how far from or close to the optimum parking position a user is as they are parking a vehicle. As a user is parking a vehicle, LIDAR is enabled and gives the user updates indicating how close they are to their optimum parking position. For example, as a user is pulling their vehicle into their garage, LIDAR may indicate that a user is 50% of the way to their optimum parking position, and as a user continues to move the vehicle forward, an update is issued indicating that the user is now 90% of the way to the optimum parking position. These updates may be played over the speakers on the parking assist apparatus or may be played on the speakers of a user's phone, or shown on an app running on a user's smart phone.

The overhead sensor, which may be a camera, in a preferred embodiment, serves as a security camera with preset smart points. The smart points are selected by a user and are comprised of recorded images of certain areas of the space wherein the parking assist apparatus is used. For example, a user may place the parking assist apparatus in a garage, and select that a man door, a house door, and the garage door are smart points. Then, the user indicates to the overhead sensor to record images of the selected smart points in a normal or nonemergency state. The user may indicate to the overhead sensor to capture the images of the smart points in a nonemergency state via an app or via controls on the parking assist apparatus. Once the nonemergency-state images are captured, a user may indicate to the parking assist apparatus with the app a security mode, away mode, or a night mode. A user is alerted if the camera detects motion in security mode, away mode, or night mode. This is accomplished with sensors. If a motion sensor is triggered by the man door when the parking assist apparatus is in security mode, the camera will rotate towards the smart point that indicated motion and send a live feed to a user's smart phone, tablet, or computer. It may also send the live feed to an app. The app may alert a user that a change has occurred, and that there is potential risk or danger imminent.

Preferably, the camera also detects and follows motion. For example, if a burglar breaks into the space wherein a user has placed the parking assist apparatus, the camera will follow the burglar as they move around and send the images and live feed to the user. The camera is equipped with infrared lights, such that it is able to record at night and send videos or images to a user's smartphone during nighttime, for example.

In addition, the parking assist apparatus is adapted to communicate with products such as those described in U.S. Pat. No. 9,988,118. This is useful in the event that a user is not nearby the area that the parking assist apparatus is monitoring. For example, U.S. Pat. No. 9,988,118 describes a bike lift. If an individual wants to lower the bike lift, the user of the parking assist apparatus can point the camera to view the bike lift and determine if it safe to lower it.

Additionally, the concentrated light or laser may be set to a random mode with the app, wherein the laser darts around a space in no specific pattern to entertain an animal such as a cat.

The short-range wireless beacon may be equipped with a button which when pressed will send an advertisement to the overhead sensor. This may be useful in the event that the overhead sensor is not properly reading the advertisement, or if a short-range wireless beacon malfunctions and does not automatically send the overhead sensor an advertisement.

Preferably the overhead sensor is a camera. The camera may include a housing, power, communication and control electronics, a motor, a rotatable camera mount extending from the housing, daisy-chain electrical outlets, an optical lens, and a lens housing rotatably mounted to the camera mount. The power, control and/or communication electronics may be similar to that described in the U.S. Pat. No. 9,624,076. The camera may interconnect with other dissimilar or similar smart devices as described in the US Published Patent Appl. No. 2018-0248369. The dual rotatable housings may allow for near- or complete-360 degree rotation of the camera lens. Preferably, the camera is rotatable 180 degrees about a vertical plane. The motor that rotates the rotatable camera mount may be disposed within the housing, a rotor or other transmissive element of the motor extending from the housing into the rotatable mount. A transmission element, such as a gear surface, may be fixed to the rotatable mount and engage with the rotatable element extending from the housing. A separate motor may be disposed within the lens housing. The upper housing of the camera may include key slots that may mount the camera to a smart track mounting system as described in U.S. Pat. No. 10,113,690.

The camera may seamlessly integrate with other smart devices via a single computer and/or smartphone application. The camera may communicate wirelessly directly with each device, wirelessly via the computer/smartphone, or via a cloud-based network and/or server. Additionally, the camera may communicate over a network such as is described in the U.S. Pat. No. 9,268,126. Instructions for operating the camera may be stored on the camera's controller, the computer/smartphone, and/or the cloud-based server. Operation of the camera may be correlated to operation of another smart device via the application. The application may include an option to activate the camera and point the camera at a preset smart point when another device activates or otherwise comes into operation. For example, the camera may activate and point the lens towards a volume beneath a smart light when the smart light is motion-activated. Such may be programmed by selecting the smart point and activation of the camera in the smart light portion of the application. The camera may further include instructions to sweep between two or more volumes when two or more smart lights are motion-activated.

The camera may include pre-programmed smart points and/or pre-programmed times of operation. For example, when the app is set to "away from home," the camera may point at specified volumes of a room and record one or a few snapshots of the volume, then move to another preset smart point to capture another portion of the room. In this way, a single camera may be used to efficiently monitor a room for security. The cloud-based server may be programmed with image-recognition software. The server may store images pre-selected by a user to represent a permitted and/or secure state of the room. As the camera performs its security sweep by taking images at smart points, the cloud-based server may store images that deviate from the pre-selected images and indicate a form of emergency, such as a fire, flooding, and/or intruders. Images that do not meet these thresholds may be discarded from the server, whereas images that do meet these thresholds may be stored. The user may program alerts for emergencies based on deviations from the pre-selected images, and/or may choose to have emergency authorities automatically notified via the server of an emergency.

The camera may additionally include pre-programmed smart points that correspond to safe operation of a device. For example, the camera may include programming that instructs it to point towards a garage door and record/stream as the garage door opens and/or closes, upon receiving a notification from the garage door that the door is actuating. As another example, the camera may include programming that instructs it to point towards an area beneath a motorized lifting device, such as that described in various of the incorporated references, upon receiving a notification from the server and/or the lifting device that the device is lowering an object. Such operation may specifically correspond to a selection by the user in the application that the operator of the lifting device is not present in the room with the lifting device as it is operating.

Figure 1A:
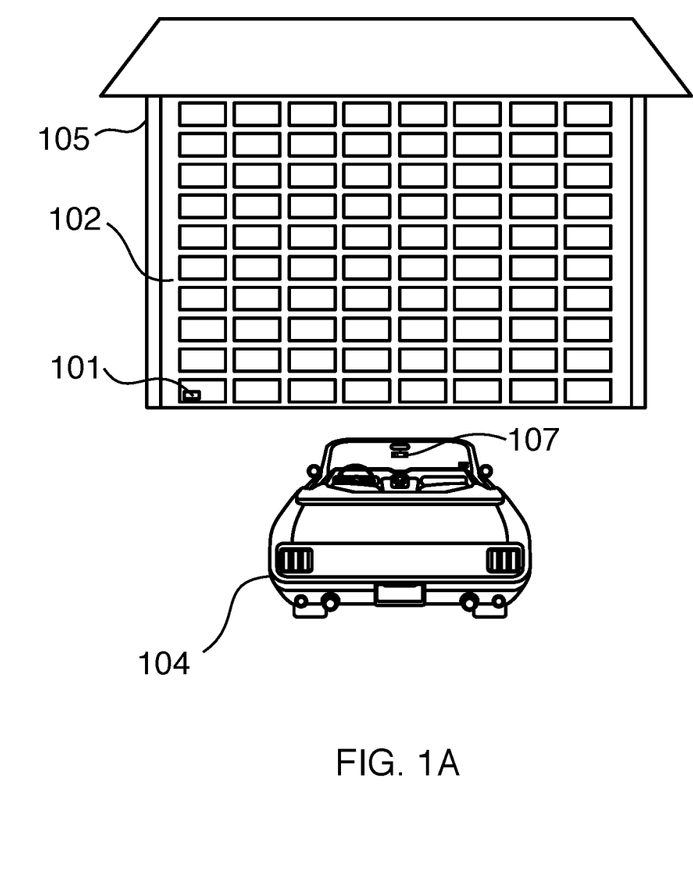
FIG. 1A is a front view of a vehicle approaching a garage while using the parking assist apparatus.
Figure 1B:
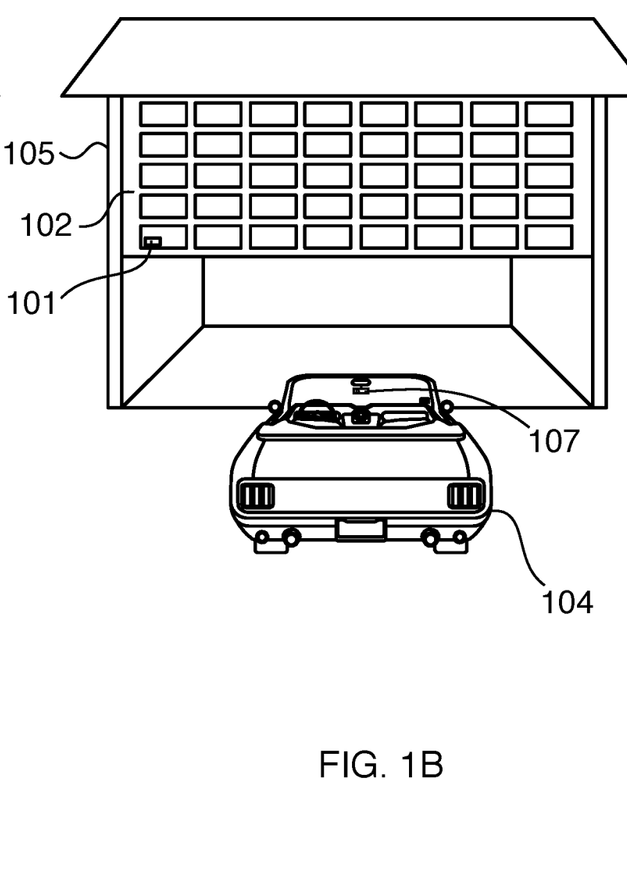
FIG. 1B is front view of a vehicle approaching a garage and the garage door in the process of opening.
Figure 1C:
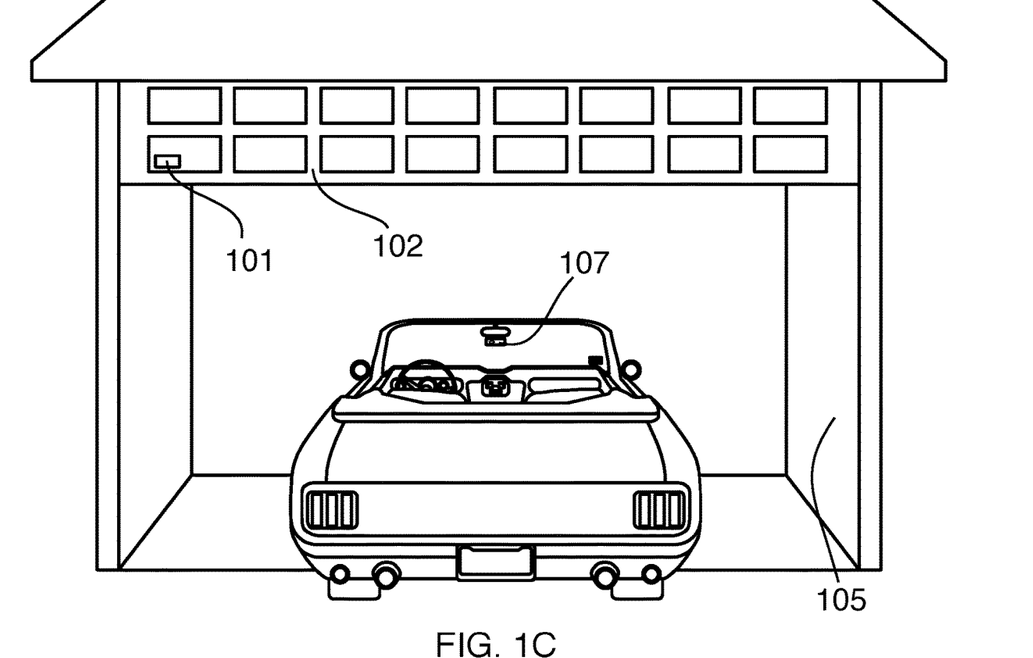
FIG. 1C is a front view of a vehicle entering a garage wherein the garage door is fully opened.

Now, referring to FIG. 1A, the parking assist apparatus 100 is installed in a garage 105. A vehicle 104 approaches the garage 105. Whereupon a driver activates the opening of the garage door 102 by using the garage door opener 107, the garage door 102 will begin to open. FIG. 1B illustrates the vehicle 104 getting closer to the garage 105 as the garage door 102 is opening. The garage door motion sensor 101 will sense the movement of the garage door 102, and signal to the controller that the garage door 102 is opening. The controller, in turn, switches the overhead sensor 103 to awake mode. FIG. 1C shows the vehicle 104 pulling into the garage 105. At this point, the overhead sensor 103, preferably a camera, is in awake mode, and is ready to guide the driver to the optimum parking position. Alternatively, a user could open a garage door 102 with a garage door opener pad attached to the garage 105. Still, the movement of the garage door 102 will cause the garage door motion sensor 101 to signal to the controller the movement of the garage door 102, which will switch the parking assist apparatus to awake mode.

In order to save energy, a user may desire that the system return to sleep mode relatively quickly after the system has been switched to awake mode. For example, many drivers are experienced and need a minute or less to park their vehicle, especially in a garage that they are familiar with. In this instance, a user might predetermine that they want the system to return to sleep mode two minutes after it is switched to awake mode after the controller receives a signal that the garage door is opening. However, wherein a driver is a slower driver or less concerned about saving power, they may determine that the parking assist apparatus returns to sleep mode ten minutes after it is switched to awake mode. Different vehicles send out different advertisements when equipped with a short-range wireless beacon. As such, the driver of different vehicles may determine different periods of time to elapse between the system being switched from awake mode back to sleep mode. Wherein a two-car garage is equipped with a single garage door motion sensor but two overhead sensors, the short-range wireless beacon may indicate which vehicle is approaching and the preferences for the length of time that will elapse between the awake mode and return to sleep mode.

Figure 2:
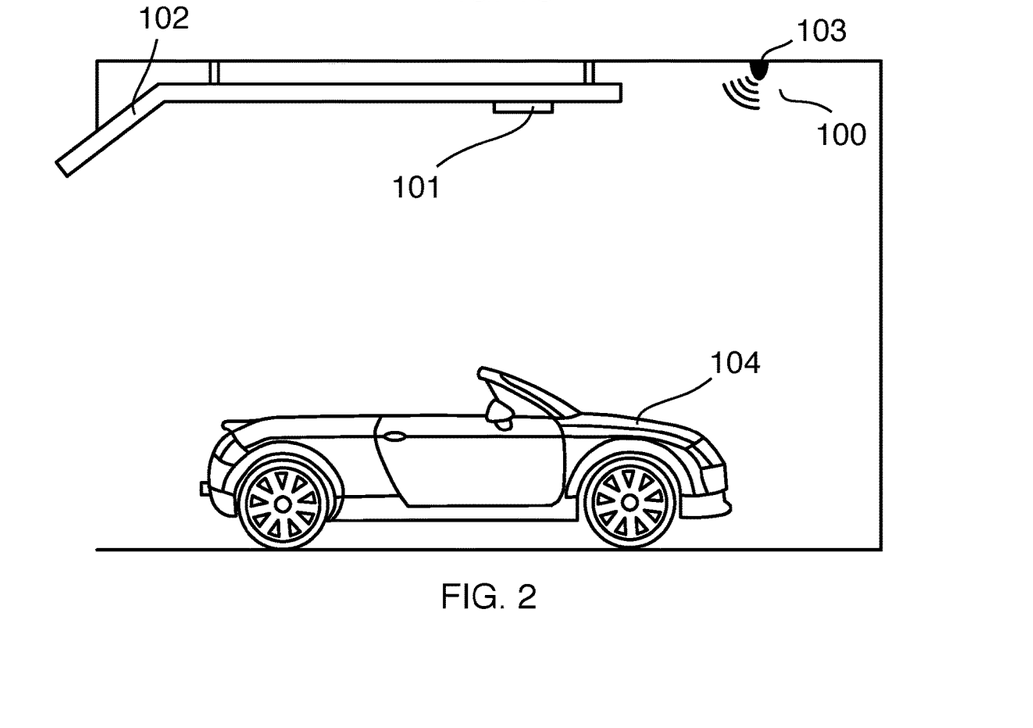
FIG. 2 is a side view of a vehicle entering a garage with the system to assist in parking a vehicle.

FIG. 2 depicts a garage door motion sensor 101 attached to the inside of a garage door 102, which may be advantageous in preventing theft. In this view, the parking assist apparatus 100, including the overhead sensor 103, is shown attached to the garage ceiling and a car 104 (e.g., vehicle) is parked.

Figure 3A:
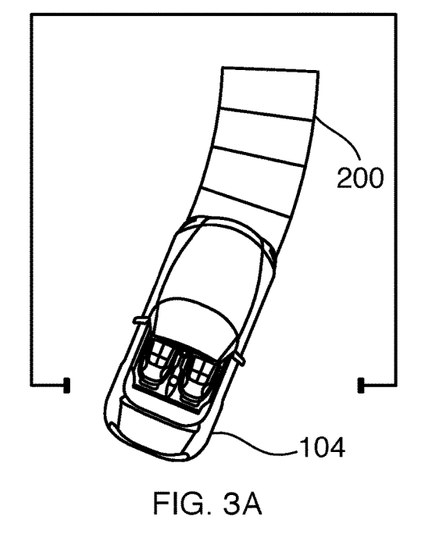
FIG. 3A is a top view of guidelines on a screen for guiding a vehicle to the optimal parking position.
Figure 3B:
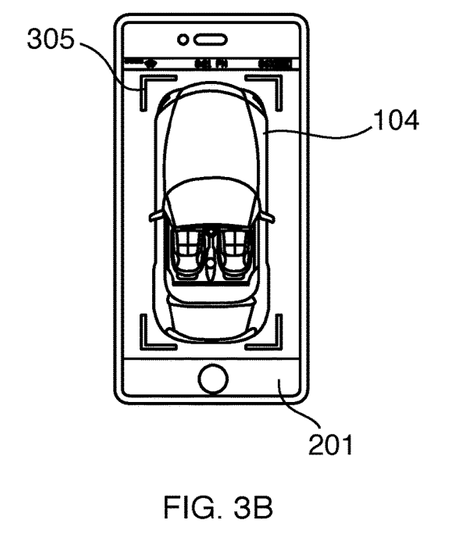
FIG. 3B is a top view of a smart phone running an app and showing the live feed from the overhead sensor.

FIG. 3A depicts an example display for a display screen showing correctional guidelines 200. The correctional guidelines 200 show how a driver should move their vehicle 104 in order to arrive at the optimal parking position (identified by guidelines 305, for example). FIG. 3B is an overhead view of a display screen with guidelines 305 at each corner of the vehicle, demonstrating a vehicle 104 that has been parked within the guidelines 305. In one embodiment, the guidelines 305 displayed on a display screen are a certain color, such as yellow. Once a vehicle has fit into the guidelines 305, and thus arrived at the optimal parking position, the guidelines 305 change from one color such as yellow, to another, such as green. In FIG. 3B, the display screen is a on a smart phone 201.

Figure 4:
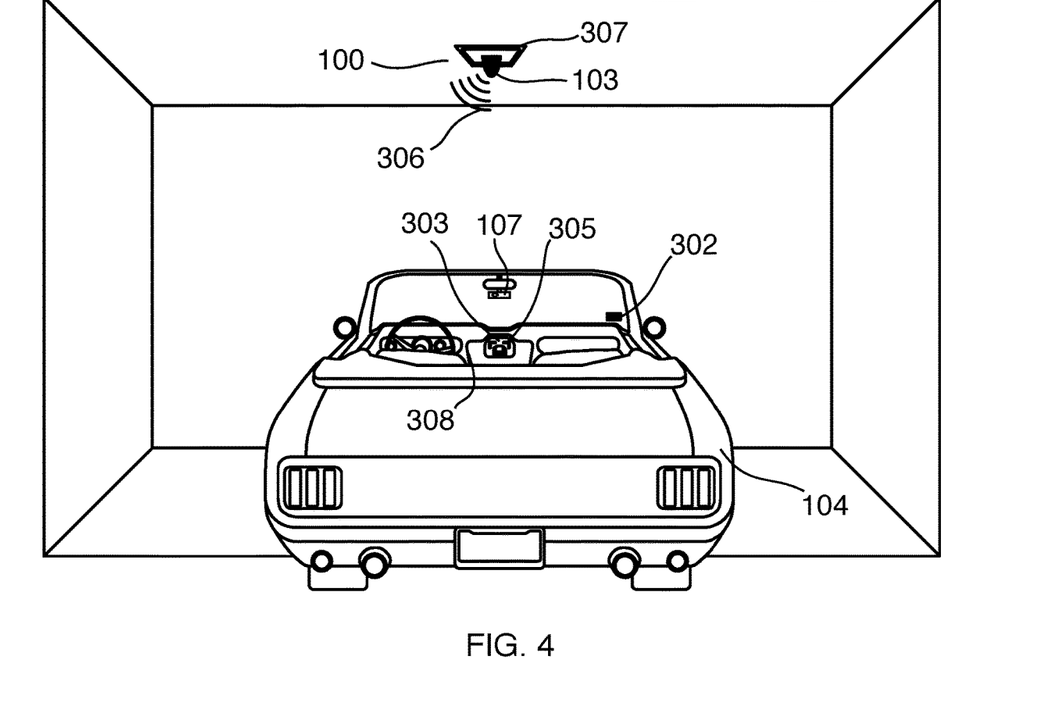
FIG. 4 is front view of a vehicle parked in a garage.

Now referring to FIG. 4, the parking assist apparatus 100 is mounted to an overhead or ceiling by mounting hardware 307. A vehicle, 104, is pulling into the garage (e.g., garage 105) and as it approaches the garage the short-range wireless beacon 302 emits a signal or advertisement to the overhead sensor 103. The overhead sensor 103 receives the signal and adjusts the guidelines 305 that are displayed on the display screen 303 of the vehicle 104. The live feed 308 of the overhead sensor 103 is useful because a driver sees their vehicle position while they are parking. They can also see any objects or items that might be in the way and that are not visible from their perspective. If an object were in the way of the vehicle 104, the speakers 306 can sound an alarm or play a message to warn the driver.

All patents and published patent applications referred to herein are incorporated herein by reference. The invention has been described with reference to various specific and preferred embodiments and techniques. Nevertheless, it understood that many variations and modifications may be made while remaining within the spirit and scope of the invention.

What is claimed is:

1. A parking assist system comprising:
   an overhead sensor mounted to a ceiling of a garage;
   a screen in a vehicle;
   a motion sensor attached to a garage door, wherein the motion sensor detects when the garage door is opening and when the garage door is closed; and
   a controller in communication with the overhead sensor, the screen, and the motion sensor, wherein the controller:
   receives a first signal from the motion sensor that indicates that the garage door is opening,
   switches the overhead sensor to an awake mode in response to the indication that the garage door is opening, wherein the overhead sensor provides images to the controller during the awake mode,
   receives an advertisement from a short-range wireless beacon;
   determines an optimum parking position for the vehicle based on the advertisement;
   receives an image from the overhead sensor;
   draws one or more guidelines on the image to indicate the optimum parking position for the vehicle, wherein the image illustrates a position of the vehicle in relation to the optimum parking position, and
   provides the image to the screen in the vehicle.

2. The parking assist system of claim 1, wherein the controller receives a second signal from the motion sensor that indicates that the garage door is closed and switches the overhead sensor to a sleep mode within a predetermined time of receiving the indication that the garage door is closed.

3. The parking assist system of claim 1, wherein the motion sensor is attached to the inside of the garage door.

4. The parking assist system of claim 1, wherein the short-range wireless beacon sends the advertisement to the controller.

5. The parking assist system of claim 4, wherein the short-range wireless beacon is coupled to the vehicle.

6. The parking assist system of claim 1, wherein the overhead sensor is a camera.

7. The parking assist system of claim 1, further comprising:
 a light, wherein the controller controls the light to project a concentrated light into the garage to indicate the position of the vehicle in relation to the optimum parking position.

8. The parking assist system of claim 7, wherein the concentrated light changes colors, shape, or both to indicate that a vehicle should stop.

9. The parking assist system of claim 1, further comprising:
 a remote device, wherein the remote device provides audible commands.

10. The parking assist system of claim 4, wherein the controller adjusts the optimum parking position based on the advertisement from the short-range wireless beacon.

11. The parking assist system of claim 9, wherein the remote device is a smart phone running an app.

12. The parking assist system of claim 1, further comprising mounting hardware for mounting the overhead sensor to the ceiling.

13. The parking assist system of claim 7, wherein the light uses LIDAR to measure distances.

14. The parking assist system of claim 7, wherein the light is a laser.

15. The parking assist system of claim 1, further comprising speakers.

16. The parking assist system of claim 1, wherein the controller includes preset smart points and modes, and wherein the overhead sensor sends a live feed to a user when motion is detected during night mode, security mode, or away mode.

17. The parking assist system of claim 16, wherein the controller sends an alert to the remote device when a state of emergency or potential danger is detected.

18. The parking assist system of claim 17, wherein the controller sounds an alarm when detecting a state of emergency or potential danger.

19. The parking assist system of claim 1, wherein the controller sounds an audible alarm sounds when the vehicle approaches an object.

20. The parking assist system of claim 1, further comprising infrared lights.

21. The parking assist system of claim 1, wherein the motion sensor is a passive infrared sensor.

22. The parking assist system of claim 1, wherein the motion sensor is a vibration sensor.

23. The parking assist system of claim 1, wherein the motion sensor is a vibration sensor, a video motion sensor, and a passive infrared sensor.

* * * * *